July 29, 1941.  M. STEIN  2,251,078

ZIP FASTENER

Filed Dec. 2, 1938

Inventor,
Michael Stein

Patented July 29, 1941

2,251,078

UNITED STATES PATENT OFFICE 2,251,078

ZIP FASTENER

Michael Stein, Vienna, Germany, assignor to the firm "Colorrip" Reissverschluss-Erzeugungs-Gesellschaft m. b. H., Vienna, Germany Application December 2, 1938, Serial No. 243,628
In Austria December 2, 1937

3 Claims. (Cl. 24—205)

This invention relates to zip fasteners differing from the known fasteners by the special kind of securing the closing members to the carrying ribbon. Hitherto zip fasteners have been made for instance in such a way that the closing members made from strips, wires or the like metal parts were fixed by squeezing on the edges of the carrying ribbons or fabric pieces. It has also been tried to secure the closing members in continuous series to a piece of fabric; in this case, the members were either elastic to such an extent that they could be fixed on the edges of the carrying ribbon or they were pasted to the said edges by means of an adhesive. It has further been tried to use non-metallic members which, however, could be secured to the carrying ribbon only by pasting, cementing or mollifying of their outer portions. Only Celluloid members are suitable for this purpose.

The invention is based upon the idea of utilizing members of other materials such as artificial resin, glass, porcelain, or the like, in order to better adapt them to the carrier of the zip fastener, and consists chiefly in that the closing members are strung on to the edge of the carrying ribbon which is reinforced as usual, like pearls on a string, by means of their fork-like ends. The insertion is carried out from one side. In order to secure the mutual position of the closing members for the correct engagement, the portions of the said closing members which are carried by the carrying ribbon are broadened. It is also possible to arrange on the carrying ribbon alternately closing and intermediate members; the latter serve for spacing apart the closing members and are also inserted from one side.

Moreover, projections may be provided on the upper and/or lower faces of the closing members which make it possible to make the handle so narrow that it does not extend beyond the width of the members, without thus reducing the efficiency of operation.

Figure 1:
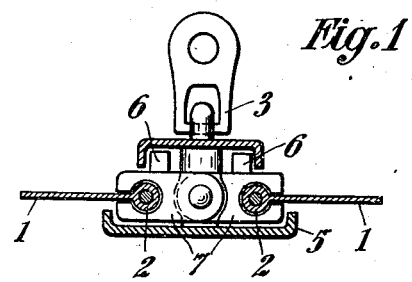
Figure 2:
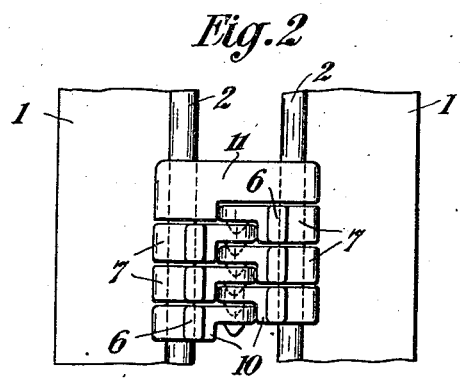

The drawing shows two constructional forms of the invention, by way of example. Fig. 1 is a section of the zip fastener, Fig. 2 shows the closely attached members provided with broadened portions, and Fig. 3 shows the assembled members spaced apart by intermediate members.

1 is a carrying ribbon having a reinforced edge 2. 3 is a handle provided with an upper portion 4 and a lower portion 5. 6 are projections on the members which allow of bringing the material on to which the carrying ribbon is sewed so close to the members that the carrying ribbon as a whole becomes invisible. 7 represents the closing members provided with projections and broadened at the borders. 8 are likewise closing members which are, however, of a narrow shape and cooperating with intermediate members 9. The closure is effected in such a manner that the members 7 with the broadened portions 10 and the projections 6 are strung on to the carrying ribbon 1 like pearls on a string so that the individual members are assembled close to each other. The opening of the fastener is effected by a handle the upper portion of which has a shape as shown in Fig. 1.

Figure 3:
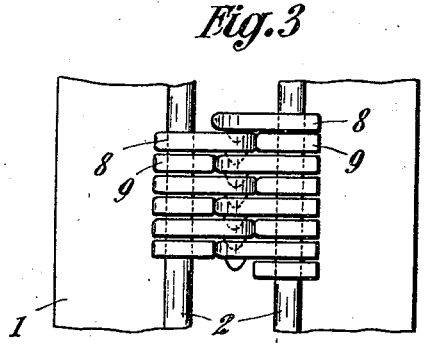

Another constructional form of the fastener is shown in Fig. 3. The members 8 are spaced apart by intermediate members 9, both the members 8 and the intermediate members 9 being assembled on the reinforced edge of the carrying ribbon in close relationship.

The members 7, 8, and 9 are individually provided with cavities having an interior surface frictionally engaging the beaded edge 2 and fitting tightly therearound and permitting sliding of members 7, 8, and 9 on said beaded edge only by application of force. A sliding off preventing means or end member 11 is provided adjacent to the outermost of the fastener elements.

The reinforcement required for stringing the members is effected by winding the carrying ribbon on its edge over a round or similarly shaped wire, string or the like.

I claim:

1. A slide fastener comprising a pair of companion stringers having beaded portions, cooperating non-metallic interlocking elements threaded therealong, each element comprising an interlocking head portion and a recessed attaching portion, said attaching portions having spacing shoulders enlarged in the direction substantially parallel to the axes of said beaded portions and having a sliding fit on said portions, the successive interlocking elements being slightly spaced between adjacent shoulders to facilitate engagement and disengagement.

2. A slide fastener comprising a pair of companion stringers having beaded portions, cooperating non-metallic interlocking elements threaded therealong, each element comprising an interlocking head portion and a recessed attaching portion, said attaching portions having spacing shoulders enlarged in the direction substantially parallel to the axes of said beaded portions and having a sliding fit on said portions to facilitate engagement and disengagement and replacement of said elements.

3. In a separable interlocking fastener of the class described, a pair of flexible stringer means having beaded edges, a plurality of non-metallic fastener elements, each element having an interlocking head portion and a recessed attaching portion, said attaching portions having spacing shoulders extending substantially parallel to said beaded edges, said attaching portions being slideably connected with and frictionally engaging said beaded edges for affording firm frictional engagement when said fastener is in normal working condition yet facilitating sliding displacement of said elements on said stringer means for removal and replacement of said elements.

MICHAEL STEIN.